UNITED STATES PATENT OFFICE.

FRANK L. DYER, OF MONTCLAIR, NEW JERSEY, ASSIGNOR TO EDISON MANUFACTURING COMPANY, OF WEST ORANGE, NEW JERSEY, A CORPORATION OF NEW JERSEY.

COLOR PHOTOGRAPHY.

947,965. Specification of Letters Patent. Patented Feb. 1, 1910.

No Drawing. Application filed April 23, 1909. Serial No. 491,811.

*To all whom it may concern:*

Be it known that I, FRANK L. DYER, a citizen of the United States, and a resident of Montclair, in the county of Essex and State of New Jersey, have made a certain new and useful Invention in Color Photography, of which the following is a description.

My invention relates to methods of forming minute granules or spheres, which may be dyed or otherwise given different light selective absorption properties and secured to a suitable support to form grained screens in the well known manner.

My object is to provide a process for producing such grains or particles of suitable minute size and in a practical, speedy and efficacious manner.

In my improved process, I preferably first form exceedingly fine filaments or fibers of celluloid, collodion, or other suitable colorless substance, from a solution of the same. For example, collodion or celluloid may be in solution in amyl acetate. Fibers or filaments may be produced from this solution in a number of ways. For example, the method described in the patent to W. J. Morton, No. 705,691, for method of dispersing fluids, patented July 29, 1902, may be utilized. In this process, the composite fluid, such as the solution referred to, is delivered in a thin film or other attenuated form into an electrically polarized atmospheric field produced by the convective passage through an atmospheric medium of an electric current of high tension. Any suitable source of high tension or static electricity may be used. The discharge of the celluloid into this field may be through a capillary tube. The result is the separation and evaporation of the volatile component of the fluid, which would be the solvent, and the simultaneous solidification of the fixed component in the form of fine fibers or filaments. Fibers or filaments can likewise be produced from a solution by other means as in a centrifugal machine, or by squirting the solution through a fine aperture in the well known manner.

The mass of fiber produced in whatever manner is collected and rendered temporarily brittle in the preferred form of my invention, as by subjecting it to intense cold. This may be done by subjecting it to an atmosphere of liquid air vapor. While in the brittle condition induced by the cold, the fibers are crushed to powder in any suitable apparatus. The minute particles so produced are sifted to size and those of suitable size may be rolled in a mill, if desired, to a spherical shape. Whether this is done or not, they are dyed in the three colors necessary to give the proper light selective absorption properties, and equal numbers of the particles of the three colors are then distributed in a layer on the support, bound together, and flattened if necessary, to fill up all interstices, or otherwise treated to form a grained screen according to processes well known in color photography.

Having now described my invention, what I claim and desire to protect by Letters Patent is as follows:

1. The process of forming grained screens for use in photographic processes consisting in exposing in attenuated form a supply of composite fluid having volatile and fixed components to the convective action of high tension electricity and disrupting the same thereby, setting the component of fixed substances while in a fine filamentous condition, subjecting the filaments or fibers so produced to intense cold, crushing the same to powder while in the brittle condition caused by the cold, sifting the grains so produced to size, imparting to the grains different light selective absorption properties, distributing said grains in a layer on a support and binding them together, substantially as described.

2. The process of forming grained screens for use in photographic processes consisting in exposing in attenuated form a supply of composite fluid having volatile and fixed components to the convective action of high tension electricity and disrupting the same thereby, setting the component of fixed substances while in a fine filamentous condition, reducing the filaments or fibers so produced to powder, sifting the grains so produced to size, imparting to the grains different light selective absorption properties, distributing said grains in a layer on a support and binding them together, substantially as described.

3. The process of forming grained screens for use in photographic processes consisting in exposing in attenuated form a supply of composite fluid having volatile and fixed components to the convective action of high tension electricity and disrupting the same thereby, setting the component of fixed substances while in a fine filamentous condition, rendering the filaments or fibers so produced temporarily exceedingly brittle, crushing the same to powder while brittle, sifting the grains so produced to size, imparting to the grains different light selective absorption properties, distributing said grains in a layer on a support and binding them together, substantially as described.

4. The process of forming grained screens for use in photographic processes, consisting in obtaining fine filaments or fibers of transparent material and rendering the same temporarily exceedingly brittle, crushing the same to powder while brittle, sifting the grains so produced to size, imparting to the grains different light selective absorption properties, distributing said grains in a layer on a support and binding them together, substantially as described.

5. The process of forming grained screens for use in photographic processes, consisting in obtaining fine filaments or fibers of transparent material and rendering the same temporarily exceedingly brittle by subjecting them to intense cold, crushing the same to powder while brittle, sifting the grains so produced to size, imparting to the grains different light selective absorption properties, distributing said grains in a layer on a support and binding them together, substantially as described.

6. The process of forming grained screens for use in photographic processes, consisting in exposing in attenuated form a solution of collodion or celluloid to the convective action of high tension electricity, disrupting the same thereby, simultaneously volatilizing the solvent and solidifying the fixed component while in a fine filamentous condition, reducing the filaments or fibers so produced to powder, sifting the grains so produced to size, imparting to the grains different light selective absorption properties, distributing said grains in a layer on a support and binding them together, substantially as described.

7. The process of forming grained screens for use in photographic processes, consisting in forming fine filaments or fibers of celluloid or collodion out of a solution of the same, rendering the filaments or fibers so produced temporarily exceedingly brittle, crushing the same to powder while brittle, sifting the grains so produced to size, imparting to the grains different light selective absorption properties, distributing said grains in a layer on a support and binding them together, substantially as described.

8. The process of forming grained screens for use in photographic processes, consisting in forming fine filaments or fibers of transparent material out of a solution of the same, rendering the filaments or fibers so produced temporarily exceedingly brittle, crushing the same to powder while brittle, sifting the grains so produced to size, imparting to the grains different light selective absorption properties, distributing said grains in a layer on a support and binding them together, substantially as described.

This specification signed and witnessed this 21st day of April 1909.

FRANK L. DYER.

Witnesses:
DYER SMITH,
JOHN M. CANFIELD.